United States Patent [19]

Akahira et al.

[11] Patent Number: 5,249,175
[45] Date of Patent: Sep. 28, 1993

[54] OPTICAL INFORMATION RECORDING MEDIUM AND INFORMATION RECORDING AND REPRODUCING METHOD THEREFOR

[75] Inventors: Nobuo Akahira, Yawata; Kenichi Nishiuchi, Moriguchi; Ken'ichi Nagata, Neyagawa, all of Japan

[73] Assignee: Matsushita Electric Industrial Co., Ltd., Osaka, Japan

[21] Appl. No.: 865,640

[22] Filed: Apr. 9, 1992

Related U.S. Application Data

[63] Continuation of Ser. No. 403,449, Sep. 6, 1989, abandoned.

[30] Foreign Application Priority Data

Sep. 9, 1988 [JP] Japan .................. 63-227015
Oct. 21, 1988 [JP] Japan .................. 63-266397

[51] Int. Cl.$^5$ .................................. G11B 5/68
[52] U.S. Cl. ........................ 369/275.1; 369/275.3; 369/275.4; 369/28 A
[58] Field of Search ............. 369/275.1, 275.2, 275.3, 369/275.4, 283, 284, 286, 288

[56] References Cited

U.S. PATENT DOCUMENTS

| | | | |
|---|---|---|---|
| 4,423,502 | 12/1983 | Dil .................................. | 369/275.3 |
| 4,441,179 | 4/1984 | Slaten .............................. | 369/275.1 |
| 4,547,875 | 6/1985 | Ohta et al. ....................... | 369/275.4 |
| 4,658,392 | 4/1987 | Langowski et al. ............... | 369/283 |
| 4,664,977 | 5/1987 | Osato et al. ...................... | 428/336 |
| 4,725,502 | 2/1988 | Kiyomiya et al. ................. | 369/288 |
| 4,731,755 | 3/1988 | Bjorklund et al. ................ | 369/284 |
| 4,782,477 | 11/1988 | Ichihara et al. ................... | 369/275.1 |
| 4,801,499 | 1/1989 | Aoyama et al. ................... | 369/288 |
| 4,839,883 | 6/1989 | Nagata et al. ..................... | 369/288 |
| 4,842,824 | 6/1989 | Ono ................................. | 369/275.1 |
| 4,852,076 | 7/1989 | Ohta et al. ....................... | 369/284 |
| 4,868,808 | 9/1989 | Tinet ............................... | 369/275.1 |
| 4,900,598 | 2/1990 | Suzuki ............................. | 369/288 |
| 4,940,618 | 7/1990 | Hamada et al. ................... | 369/275.1 |
| 4,954,379 | 9/1990 | Nishida et al. ................... | 369/288 |

FOREIGN PATENT DOCUMENTS

| | | |
|---|---|---|
| 54-3725 | 2/1979 | Japan . |
| 58-17545 | 2/1983 | Japan . |
| 61-68296 | 4/1986 | Japan . |
| 63-70939 | 3/1988 | Japan . |
| 64-27049 | 1/1989 | Japan . |
| 2-96940 | 4/1989 | Japan . |
| 1-162244 | 6/1989 | Japan . |
| 2-113451 | 4/1990 | Japan . |
| 2-219685 | 9/1990 | Japan . |
| 2-223016 | 9/1990 | Japan . |
| WO8809549 | 12/1988 | PCT Int'l Appl. . |
| 2165264 | 4/1986 | United Kingdom ............. 369/275.1 |
| 2165264A | 4/1986 | United Kingdom . |

OTHER PUBLICATIONS

High Speed Overwritable Phase Change Optical Disk Material, vol. 26 (1987) Supplement 26-4, Japanese Journal of Applied Physics.

*Primary Examiner*—Eugene R. LaRoche
*Assistant Examiner*—Tan Nguyen
*Attorney, Agent, or Firm*—Stevens, Davis, Miller & Mosher

[57] ABSTRACT

An optical information recording medium includes a thin film material formed on a substrate; the optical constant of this thin film material is changed upon application of an incident light beam, such that the optical phase of reflected or transmitted light is shifted thereby reproducing a signal by detecting the change in either the reflected or transmitted light due to this optical phase change. It is also possible perform signal reproduction equivalent to conventional concave-convex pit methodology, but without being accompanied by resulting media deformation, thereby improving the recording density. It is easy to interchange with optical recording media of the write-once and read-only types, and, furthermore, it is possible to erase and rewrite at will.

22 Claims, 11 Drawing Sheets

INCIDENT LASER BEAM

INCIDENT LASER BEAM

INCIDENT LASER BEAM

OPTICAL INFORMATION RECORDING MEDIUM AND INFORMATION RECORDING AND REPRODUCING METHOD THEREFOR

This application is a continuation of application Ser. No. 07/403,449, filed Sep. 6, 1989 now abandoned.

BACKGROUND OF THE INVENTION

The present invention relates to an optical information recording medium which is suitable for recording and reproducing information at high speed and at high density by changing some property of a recording film with use of light, heat and the like.

By focusing a laser beam through a lens system, a small light spot having a diameter on the order of the wavelength of the beam can be formed. Use of such light beam makes it possible to form a light spot the energy density per unit area of which is high, even with use of a light source of low output power. It is therefore possible to change the material in a very small area thereof and, in addition, to read the change in that very small area. An optical information recording medium was produced by making use of this technology. Hereinafter, the optical information recording medium will be referred to as "optical recording medium" or simply as "medium".

The optical recording medium has a basic structure comprising a substrate with flat surface and a recording film layer formed on the substrate so as to make some change in state with application of the laser beam spot. Recording and reproduction of a signal are carried out in the following manner. Namely, the laser beam is focused to be applied or irradiated onto the recording film surface of the medium of a plate shape which is moved by rotating means or translating means such as motor. The recording film absorbs the laser beam to result in the temperature rise. As the output power of the laser beam is made greater than a certain threshold value, the state of the recording film is changed to allow information to be recorded. This threshold value is a quantity which depends on the thermal characteristics of the substrate, relative transverse speed of the medium with respect to the light spot and the like, in addition to the characteristics of the recording layer itself. Reproduction of the recording information is carried out by applying onto the recorded portion the laser beam spot of an output power sufficiently lower than the above threshold value and, then, detecting difference between the recorded portion and the non-recorded portion in some optical characteristic such as the intensity of transmitted light, the intensity of reflected light or the direction of polarization of these lights.

For this reason, it is hoped to develop a structure and a material the state of which is changed with a small power of the laser so as to show a significant optical change.

There are known, as the recording film, metal films of Bi, Te, or containing Bi or Te as main ingredient, and compound film containing Te. These recording films are applicable to ablative recording in which the laser beam is applied to melt or evaporate a port of the film so as to form a small hole. Since the optical phase of the reflected light or transmitted light is difference between from the recorded portion and from its peripheral portion, the lights are cancelled each other due to destructive interference or diffracted so as to change the quantity of the reflected or transmitted light capable of reaching a detection system. Reproduction is effected by detecting this change. On the other hand, there is known another recording medium called structural phase change or phase transition type in which optical change takes place without causing any change in shape of the medium. There have been proposed as the recording film material an amorphous chalcogenide film and an oxide film containing Te-TeO$_2$ as main ingredient (Japanese Patent Examined Publication No. 54-3725). There has also been known a thin film containing Te-TeO$_2$-Pd as main ingredient (Japanese Patent Unexamined Publication No. 61-68296). As the laser beam is applied to these films, at least one of the refractive index and the extinction coefficient of the film is changed so as to effect recording. Amplitude of the transmitted or reflected light is changed in this recorded portion. As a result, the quantity of the transmitted or reflected light capable of reaching the detection system is changed so that reproduction of signal is effected by detecting this change.

Light is wave and, accordingly, is characterized by amplitude and phase. As described above, reproduction of signal is detected in accordance with the change in the quantity of the transmitted or reflected light, this change being attributable to a change in the amplitude of the transmitted or reflected light in a very small area of the film itself (amplitude change or modulation recording) and to a change in the optical phase of the transmitted or reflected light (optical phase change or modulation recording). Incidentally, reflection coefficient means hereinafter a ratio of the light energy (that is, a square of amplitude) of the reflected light to that of the incident light.

In the ablative one of the optical recording mediums described above, the quantity of the reflected light is changed greatly and the optical phase modulation recording is carried out so that recording can be executed at high recording density. However, it is difficult to form regular holes and the noise level is high at the time of reproduction. Further, it is impossible to provide a contact Protective structure so that it is necessary to provide a complicated hollow structure called air-sandwiched structure, resulting in difficulty in manufacture and high cost. In addition, since deformation of recording layer is carried out upon recording, it is impossible to erase and rewrite.

To the contrary, the structural phase change type recording medium is not accompanied with deformation so that it can have a simple structure and can be manufactured easily and at low cost. However, there has conventionally been a problem that since amplitude modulation recording has been carried out the recording density is low as compared with ablative recording. Further, there is another problem that it is difficult to have compatibility with the write once type recording medium and the read only type replica disc (such as audio disc and video disc) which are optical phase change type recording media making use of concave-/convex pits. In addition, there arises a further problem that when the of the geometrical deformation type recording region with the concave/convex pits and the structural phase change type recording region are made to coexist together in advance on one recording layer, reproducing signals from the both regions are differed from each other in the form having the recording information therein.

SUMMARY OF THE INVENTION

An object of the present invention is to provide a structural phase change type optical recording medium which is capable of recording information at high density as compared with a conventional structural phase change type optical recording medium.

Another object of the present invention is to provide an optical recording medium which can be easily made compatible with optical discs of write once type and read only type making use of concave/convex pits.

Still another object of the present invention is to provide an erasable optical medium which can be compatible with optical discs of write once type and read only type making use of concave/convex pits.

A further object of the present invention is to provide an optical recording medium which enables recording to be effected on a tracking groove at high density and is capable of recording and reproducing the recorded information while effecting tracking by making use of the tracking groove, and a recording and reproducing method therefor.

In order to achieve the above object, there is provided according to the present invention an optical information recording medium in which a thin film recording layer material having optical constant(s) to be changed with application of a light beam is formed on a base material so that the optical phase of reflected or transmitted light is changed between before and after the change of the optical constant, and a change in the overall amount of the reflected or transmitted light due to this optical phase change is detected. Further, it is preferable that the optical information recording medium has a structure which causes no change or a small change in the amplitude of the reflected or transmitted light between before and after that change.

With the structure above, it is possible to effect recording which is optically equivalent to the optical phase modulation recording making use of concave/convex pits. Therefore, it is possible to perform the structural phase change recording at high recording density and it is easy to have compatibility with the write once type optical recording medium and the read only type replica disc (such as audio disc and video disc) making use of the concave/convex pits. Furthermore, reproducing light from the state in which the information signal has been recorded beforehand with use of concave and convex is equivalent to reproducing light from the state in which the structural phase change recording has been effected, so that reproduction of the information signal can be Performed with use of the same optical reproducing system and signal processing circuit. In addition, since the structural phase change recording is not accompanied with deformation, it is possible to reverse the recorded state to the original state, that is, to erase and rewrite, by suitably selecting the material, thereby realizing the rewritable type optical phase modulation recording.

BRIEF DESCRIPTION OF THE DRAWINGS

The above-mention and further objects of the invention as well as above-mentioned and further features and advantages of the invention will be made clearer from description of preferred embodiments referring to attached drawings in which.

DETAILED DESCRIPTION OF THE PREFERRED EMBODIMENTS

Figure 4:
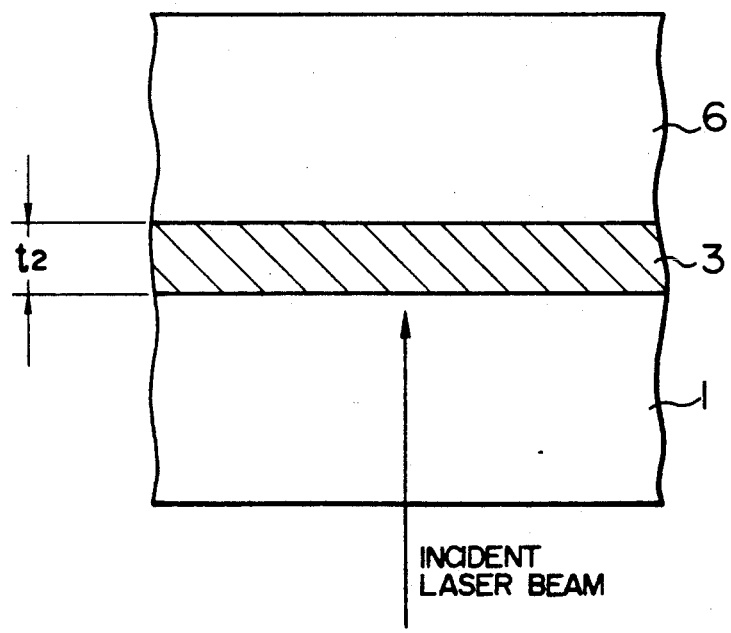
FIG. 4 is a schematic sectional view showing the conventional structure according to the prior art.

Before explaining embodiments of the invention, an example of the structure of the conventional structural Phase change type optical recording medium is explained for comparison referring to FIG. 4. A recording film or layer 3 is formed on a substrate or base material 1 and a protective layer 6 is further formed on the recording film 3. The protective layer 6 may be dispensed with and, in that case, it is supposed to be an air layer in place of the protective layer 6. Laser beam is applied through the base material 1 so as to be focused on the recording film 3, thus effecting recording and reproduction.

Figure 5:
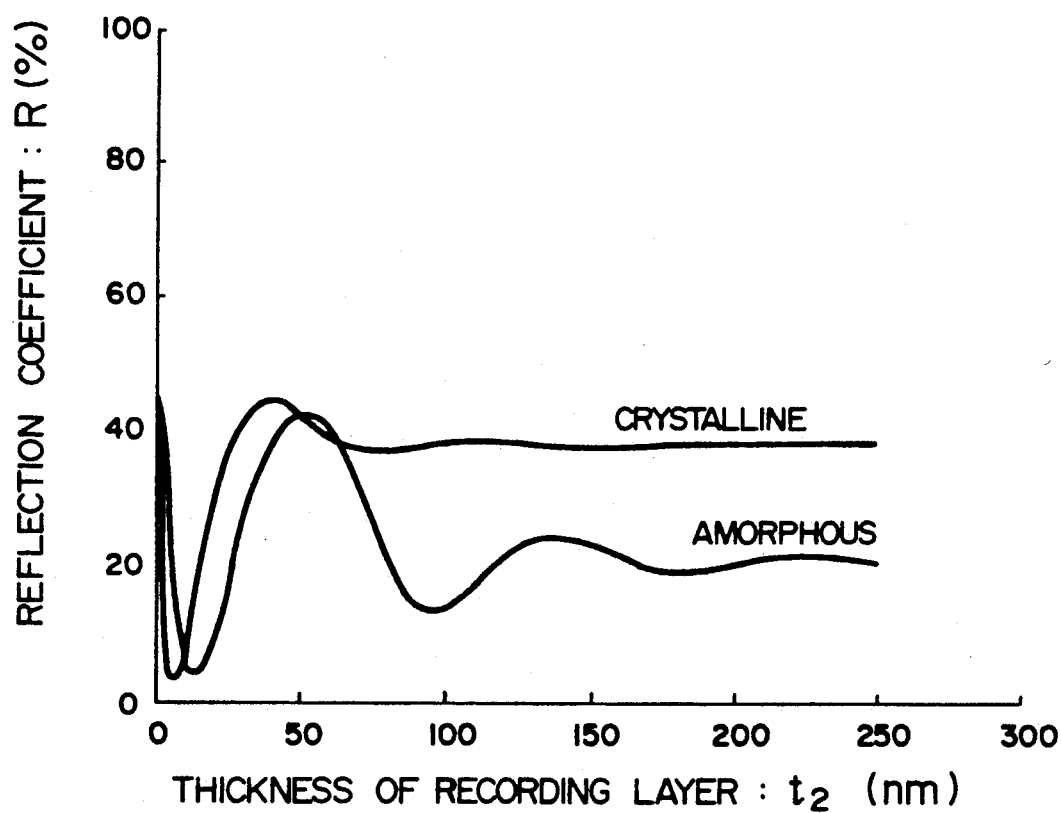
FIG. 5 is a graph showing the dependence of the reflection coefficient on the thickness of the recording film in the conventional structure.
Figure 6A:
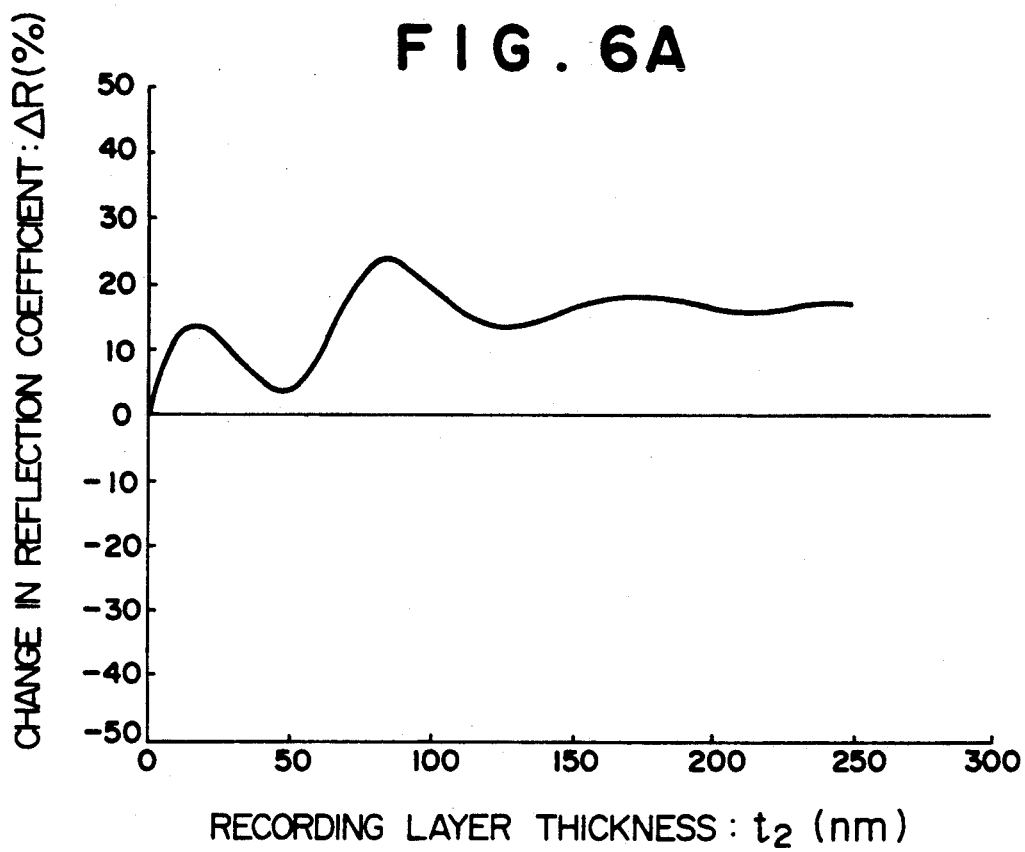
FIGS. 6A and 6B are graphs showing the dependence on the recording film thickness, of the change in the reflection coefficient and of the optical phase change of reflected light in the conventional structure, respectively.

A structural phase change type recording material is used as the recording film. As the laser beam is applied to the structural phase change type recording material to generate heat and raise the temperature, the phase of the material is changed to thereby change the complex refractive index. In the general case, the refractive index and the extinction coefficient are changed in a positive correlation. For example, a change from amorphous state to crystalline state generally results in increase in the refractive index and the extinction coefficient. The reflection coefficient of such recording layer 3 depends upon the film thickness $t_2$ of the recording film layer 3. This will be explained in connection with FIGS. 5 and 6. In a case that the light beam is made incident from the side of the base material 1, the reflection coefficient R of the recording film 3 is obtained as a result of multiple interference of the reflected light from a light-incident surface of the recording film and the reflected light from a surface thereof on the opposite side to the light-incident surface. As the film thickness $t_2$ is changed, the reflection coefficient R is increased and decreased as a result of interference with a period determined in accordance with the wavelength and the refractive index. However, with the increase of the film thickness, the quantity of the reflected light from the surface on the opposite side to the light incident surface is reduced owing to absorption, thus reducing the effect of interference. In consequence, a curve of the reflection coefficient shown in FIG. 5 is obtained in which the magnitude of increase and decrease attributable to the interference is gradually reduced with the increase of the film thickness. As the absolute value of the complex refractive index becomes large the refractive index (real part) is increased, so that the Period or change in the film thickness giving an extreme value of reflection coefficient due to the constructive/destructive interference becomes small and, at the same time, the film thickness giving the same level of light intensity is reduced in accordance with the increase in the extinction coefficient (imaginary part). As result, a reflection coefficient difference ΔR obtained at the time of the structural phase change is also changed in accordance with the film thickness as shown in FIG. 6A. It is general that the reflection coefficient difference ΔR becomes a local maximum with a film thickness which causes the reflection coefficient to become a local minimum in the phase having a smaller complex refractive index.

On the other hand, with the above structure, the optical phase change of the reflected light is small between before and after the structural phase change. The conventional structural phase change type recording medium has been used with a film thickness which causes the reflection coefficient change to become a local maximum. Accordingly, reproduction of the recorded information is carried out by detecting the difference in the reflection coefficient mentioned above. In case of recording and reproduction in a very small area of micron order, the size of the recorded portion and the size of the light beam for use in reproduction are of the same order. For example, when the laser beam having a wavelength of about 800 nm is focused by a lens system having N.A ((numerical aperture) of about 0.5, the beam can be focused to have a radius of about 0.9 μm FWHM (full width half maximum). When such beam is used to effect recording with high power, the structural phase change takes place in a range of about 0.5 to 1 μm or so to thereby provide the recorded state. Thinking about a case of reproducing this recorded state with use of the same beam, the intensity of light of the reading beam is distributed in the form of Gaussian distribution or similar one and expands outwardly of the range of the recorded state where the structural phase change has taken place, so that the overall intensity or amount of the reflected light is in proportion to the value which is the average of the reflection coefficient of the recorded state and the reflection coefficient of the non-recorded state located therearound respectively weighed by their own areas and the light intensity distribution. In consequence, when the area of the recorded state range has not enough size to cover the size of the reading beam, it is impossible to obtain satisfactory reproducing signal. Thus, the required size of the area of the recorded state limits the recording density.

On the other hand, in the case of the ablative type, the recorded state corresponds a concave/convex form so that the intensity or amount of the reflected light is changed due to interference of the reflected light from the recorded portion and its peripheral portion Therefore, when the optical phase difference between the reflected lights from the hole portion and its peripheral portion is $(1 \pm 2n)\pi$ (n: integer, $\pi$: circular constant), the change in the overall intensity or amount of the reflected light becomes the greatest, so that it is desirable that the optical phase difference is approximated to, particularly, substantially equal to this value. Further, in regard to the intensity distribution of the reading beam, when the intensity of the beam incident to the hole portion is equal to that incident to the peripheral portion, interference shows the greatest effect and, accordingly, the change in the overall reflected light intensity is made great. Namely, in a case that the area of the recorded state is smaller than the size of the reading beam, it is possible to have a large reproducing signal. It is understood from the description above that the optical phase modulation recording assures the recording and reproduction at higher density than the reflection coefficient change recording.

Accordingly, the structure by which the optical phase change due to the structural phase change recording is detected assures a high recording density equally to that of the concave/convex recording. In addition, it is desirable that there is caused on or little change in the reflection coefficient.

In order to form the above-described optical phase change type optical recording medium by making use of the structural phase change type recording film material, it is preferred to provide at least on one surface of the recording layer a transparent layer the refractive index of which is different from the adjacent substrate or protective layer at the wavelength of the laser beam used. When the refractive index of the material being in contact with the recording film is changed, the reflected light is changed at respective interfaces. The reflected light from the recording film is obtained as a result of multiple interference of the reflected light from the light incident surface of the recording film and the reflected light from the surface on the opposite side to the light incident surface. In a case where the thickness of the recording film is sufficiently small and the intensity of the light arriving at the surface on the opposite side to the light incident surface is sufficiently high, there is a condition that in the non-recorded state the optical constant(s) of which is small, the intensity of the light to be reflected after arriving at the surface on the opposite side to the light incident surface is larger than that of the light reflected from the light incident surface, while in the recorded state the optical constant(s) of which is large, the intensity of the light reflected from the light incident surface is larger than that of the light to be reflected after arriving at the surface on the opposite side to the light incident surface. Optical lengths for the both are different from each other so that there is an optical phase difference between them. When this optical Phase difference is large, it becomes possible to make the optical phase of the whole reflected light change greatly when the optical constant(s) is changed due to recording, as a result of destructive interference. Further, if the difference in amplitude between the both is substantially equal before and after the recording (although it goes without saying that the relation is reversed in terms of the magnitude), the reflection coefficient can be scarcely changed.

Further, it is possible to obtain a more efficient optical phase change type optical recording medium by forming, on a substrate, a first transparent layer the refractive index of which is different from that of the substrate, a recording layer, a second transparent layer and a reflective layer in the mentioned order and by selecting properly the thicknesses of the first transparent layer, the recording layer, the second transparent layer and the reflective layer. This is because the light transmitted through the recording layer is reflected by the reflective layer so as to efficiently conduct destructive interference with other reflected light.

On the other hand, in the optical recording medium such as optical disc, it is general to employ a tracking method making use of a groove formed in the substrate (e.g., see "OPTICAL DISC TECHNOLOGY" complied under the supervision of Mr. Morio Onoe, published by Radio Gijitsusha Co., Ltd., Chapter 1, 1.2.5, pages on and after 79). In this case as well, the groove serves to change the optical phase of the reflected light so as to give information required for tracking to the detection system. Therefore, in case of performing the optical phase change (modulation) recording/reproduction simultaneously with tracking by following the tracking groove, the optical phase change due to groove and the optical phase change due to recorded information are superimposed. Accordingly, it is necessary to make consideration on how to execute the optical phase modulation recording and reproduction without damaging the tracking function.

Figure 13:
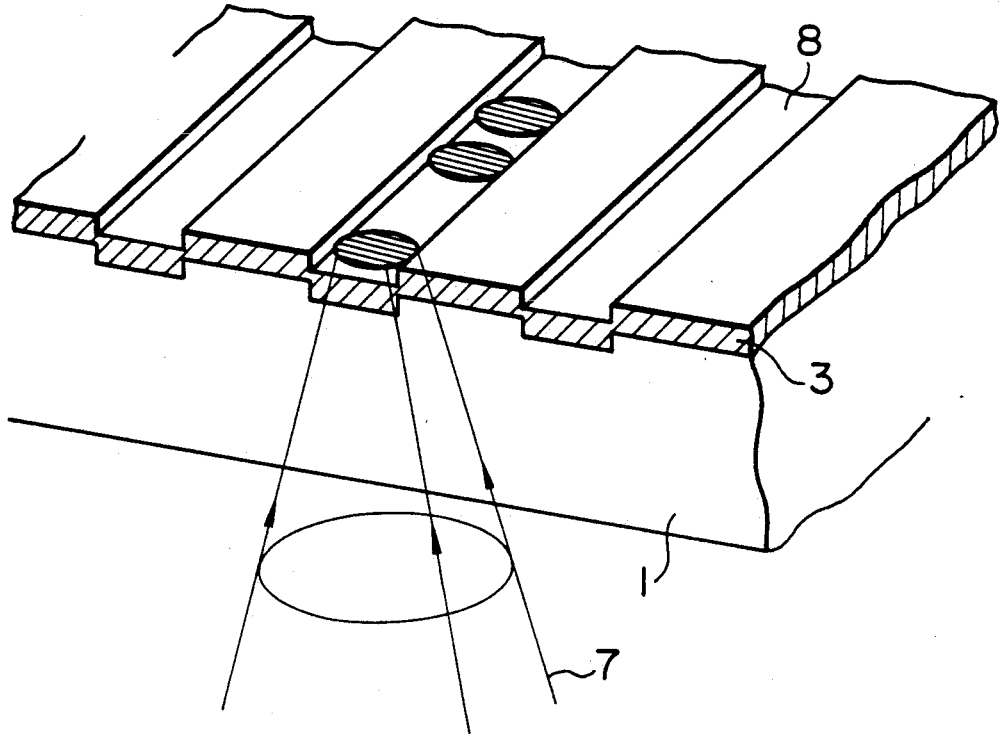

More specifically, as shown in FIG. 13, it is usually designed that the tracking groove 8 is made to be convex toward the incident side of the laser beam 7 and has a depth capable of providing an optical phase difference of $-\pi/2$, so that when the optical phase difference due to the structural phase change recording is $\pm \pi$, the both are superimposed to provide a total optical phase difference of $+\pi/2$ or $-3/2 \times \pi$, thereby reversing the polarity of the tracking signal (for details, see the above-mentioned book). In such case, in order to obtain satisfactory reproducing signal without affecting the tracking, it is necessary to prevent the reverse of the total optical phase difference by setting the optical phase change due to the structural phase change recording to $+\pi/2$. In this case, since the total optical phase difference in the recorded portion is 0 (zero), the polarity of the optical phase difference which is the average of the recorded portion and the non-recorded portion is still minus, thereby preventing the reverse. In addition, the fact that the optical phase difference is 0 means such a state that is equivalent to the state in which the groove disappears, thus making it possible to obtain the reproducing light equivalent to the reproducing light from a portion in which a signal indicative of address or the like has been formed beforehand and in which the groove is not formed.

Furthermore, a tracking groove may be alternatively made to be concave as seen from the laser beam incident side contrary to the groove shown in FIG. 13. In this case, since the optical phase difference due to the groove is $\pi/2$, the optical phase change due to the structural phase change recording may be selected to be $-\pi/2$.

Figure 14:
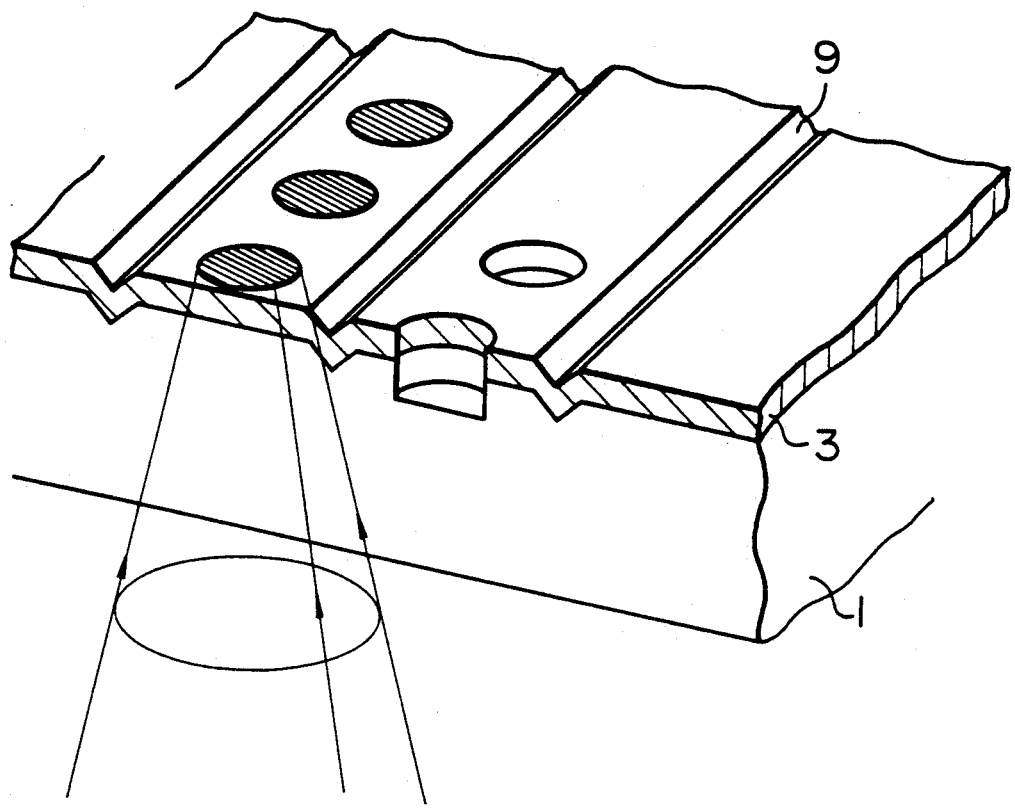

There is also known a tracking groove 9 of what is called "on land type" as shown in FIG. 14. In this case, tracking signal due to the groove 9 does not affect the reproduced signal of the recorded information (see the above-mentioned book) so that it is possible to set the optical phase difference due to the structural phase change recording at the maximum of $\pm \pi$. Reference numeral 7 denotes the laser beam.

Figure 15:
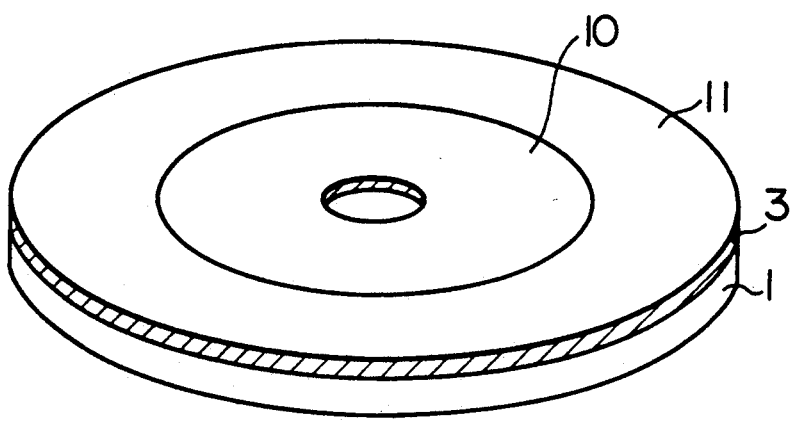

By making use of the technique above, it is possible to obtain an optical disc in which a surface on which a recording layer 3 is formed is divided into two sections 10, 11 so as to make one 10 of the sections serve as a signal recording surface in the form of concave/convex pattern formed beforehand and the other section 11 as a write once or rewritable recording surface of optical phase change type making use of the structural phase change as shown in FIG. 15, for example. Reproduction from the both recording surfaces can be carried out with use of the same optical system and signal processing system. Accordingly, it is possible to obtain an optical disc having a plurality of functions and a method for reproducing it with use of a simple and inexpensive system.

Figure 1:
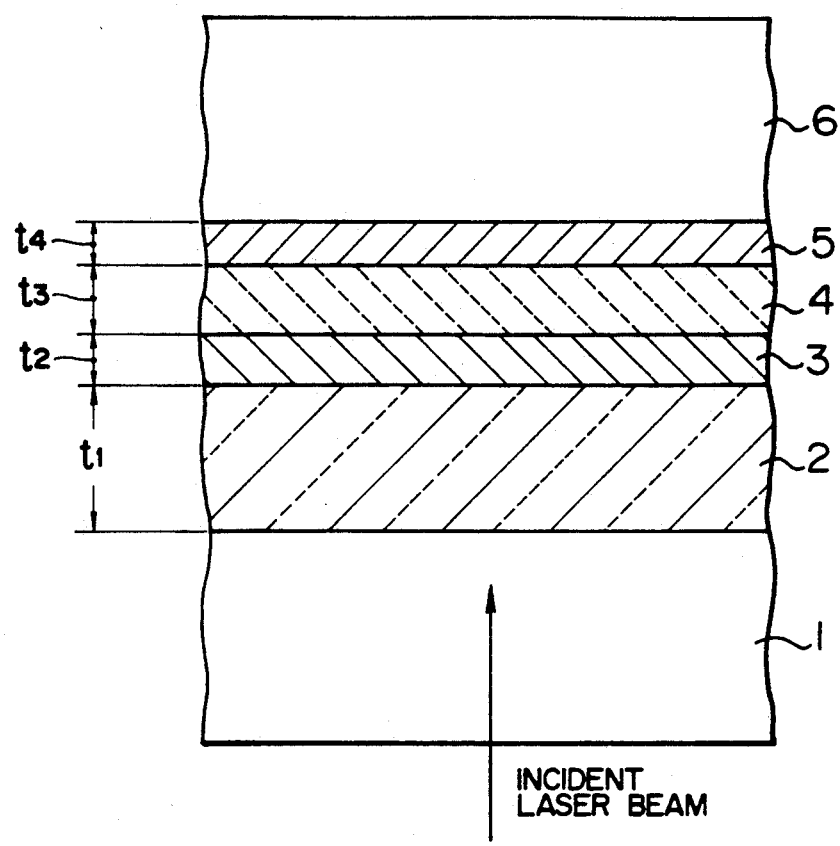
FIG. 1 is a schematic sectional view showing a structure according to an embodiment of the present invention.

Now, description will be given below in conjunction with concrete embodiments. As for the structure of the recording medium, there is formed, on a substrate or base material 1, a transparent layer 2 of dielectric or the like, a recording film 3, another transparent layer 4 of dielectric or the like and a reflective layer 5 in the mentioned order as shown in FIG. 1. A contact transparent protective layer 6 is further formed on the reflective layer 5. The protective layer 6 may not be provided, although not shown in a drawing. In this case, when it is supposed to provide an air layer (having a refractive index of 1.0) in place of the protective layer, they are considered to be optically equivalent and hence can achieve the same effects It is necessary that the transparent layer 2 is made of a material the refractive index of which is different from that of the substrate 1.

By suitably selecting the thickness $t_2$ of the recording film 3, the thicknesses $t_1$ and $t_3$ of the transparent layers 2 and 4, and the thickness $t_4$ of the reflective layer 5, it is possible to obtain an optical recording medium which shows a great change in optical phase. It is also possible to obtain an optical recording medium which shows a great change in optical phase and a small change in reflection coefficient.

The substrate 1 is a flat plate with a smooth surface which is transparent with respect to a given wavelength of the laser beam used for recording and reproduction. For example, plates of glass, resin and the like material can be used. Further, the substrate may be provided on its surface with a groove for tracking.

As for the protective layer 6, any material can be used so far as it has a function of protecting the thin layer formed on the base material including the substrate 1 mechanically or chemically. For example, a coating formed by applying and drying the resin dissolved in a solvent or a plate of glass or resin bonded to the base material with adhesives can be used.

The recording film 3 is formed by a material phase-changeable between amorphous and crystalline phase like a chalcogenide such as GeSbTe base or system, SbTe base, InTe base, GeTeSn base, SbSe base, TeSeSb base, SnTeSe base, InSe base, TeGeSnO base, TeGeSnAu base and TeGeSnSb base. Oxide materials such as Te-TeO$_2$ base, Te-Teo$_2$-Au base, Te-TeO$_2$-Pd base and the like can also be used. Furthermore, a metallic compound such as AgZn base, InSb base and the like phase-changeable between one and another crystalline states thereof can be used.

As for the transparent layer 2, material which is transparent and the refractive index of which is different from that of the substrate 1 at the wavelength of the laser beam used for recording and reproduction can be used. For example, oxides such as SiO$_2$, SiO, TiO$_2$, MgO and GeO$_2$, nitrides such as Si$_3$N$_4$, BN and AlN, and sulfides such as ZnS, ZnSe, ZnTe and PbS can be used.

As for the reflective layer, a thin film is used that has a sufficient reflection coefficient at the wavelength of the laser beam used for recording and reproduction. For example, a metal such as Au, Al and Cu or a dielectric multilayer film having a large reflection coefficient at the predetermined wavelength can be used.

In order to have the above materials deposited in the form of a thin film or layer, there are known a vacuum evaporation method using a multi-source, a sputtering method using a compound mosaic target and other like methods.

COMPARATIVE EXAMPLE

A ternary compound of germanium, antimony and tellurium having the composition of $Ge_2Sb_2Te_5$, which is a structural phase change material, was used as the recording film. The recording film or layer was formed by an electron beam evaporation method which used three evaporation sources of Ge, Sb and Te so as to independently control the evaporation rate from each evaporation source. The recording film was formed in an amorphous state. On measuring the optical constants of the film in the amorphous state formed by depositing the material of the composition of $Ge_2Sb_2Te_5$ alone onto the glass plate by evaporation, the complex refractive index $n + ki$ 4.8+1.3i at the wavelength of 830 nm. After subjection of this film to annealing at 300° C. for five minutes so as to change into crystalline state, the value was changed to 5.8+3.6i.

Figure 6B:
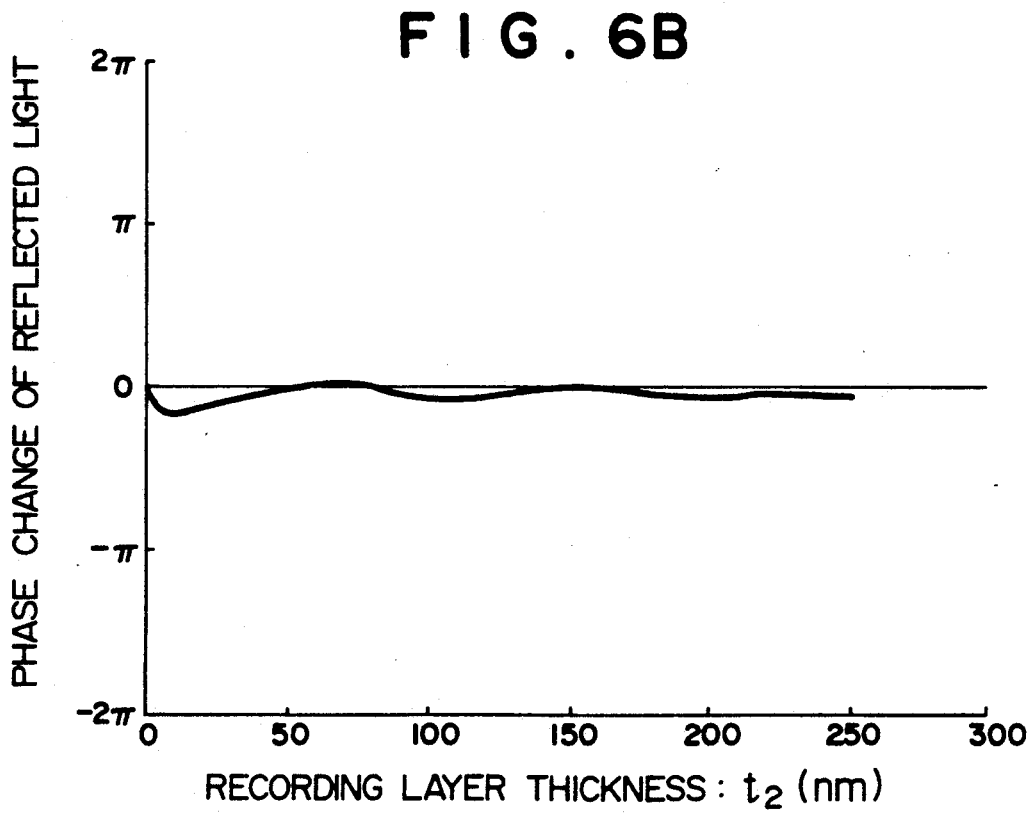

The $Ge_2Sb_2Te_5$ film was deposited by evaporation in the same manner as above onto a polycarbonate resin plate (abbreviated as PC and having a refractive index of 1.58) and is further coated with resin of the same refractive index so as to provide the conventional structure as shown in FIG. 4. FIGS. 6A and 6B show the calculated values of the dependency, on the film thickness $t_2$, of the change $\Delta R$ of the reflection coefficient R and of the optical phase change of the reflected light in this structure, in case of the light having the wavelength of 830 nm, between before and after annealing, that is, between in amorphous state and in crystalline state.

The reflection coefficient and the optical phase of the reflected light were calculated from the complex refractive index and the film thickness of each layer in accordance with the matrix method (for example, see "WAVE OPTICS" written by Mr. Hiroshi Kubota, published by Iwanami Shoten Co., Ltd., 1971, Chapter 3). In this case, on the assumption that the substrate 1 and the protective layer 6 have infinite (thicknesses neglecting effects of the interface between the substrate and air and the interface between the contact protective layer and air), the reflection coefficient R was derived as the ratio of the intensity of the light reflected into the substrate 1 to the intensity of the light incident from the substrate 1 and the optical phase was derived taking the optical phase at the interface between the substrate 1 and the transparent layer 2 as the reference phase. The optical phase is equivalent with a period of $2\pi$, this fact being taken into account in the drawings.

The difference $\Delta R$ in the reflection coefficient between the amorphous state and the crystalline state becomes maxima local at the film thicknesses of 15 nm and 85 nm and takes the value of 14% and 24%, respectively, while there is caused very little optical phase change of not larger than $\pi/6$.

EXAMPLE 1

In an embodiment of the present invention, as shown in FIG. 1, zinc sulfide (ZnS having a refractive index of 2.10) was deposited by electron beam evaporation method onto the substrate 1 of polycarbonate resin plate (PC having the refractive index of 1.58) so as to serve as the transparent layer 2, onto which the recording film 3 of $Ge_2Sb_2Te_5$ shown in the Comparative Example was formed in the same manner as in the Comparative Example and, further, ZnS was deposited by evaporation in the same manner as the transparent layer 2 for serving as the transparent layer 4. On the transparent layer 4, gold (Au having a refractive index of 0.20+5.04i) was deposited by electron beam evaporation method so as to serve as the reflective layer 5 which was further coated with acrylic resin having the same refractive index as the substrate 1 so as to form the protective layer 6.

Figure 7:
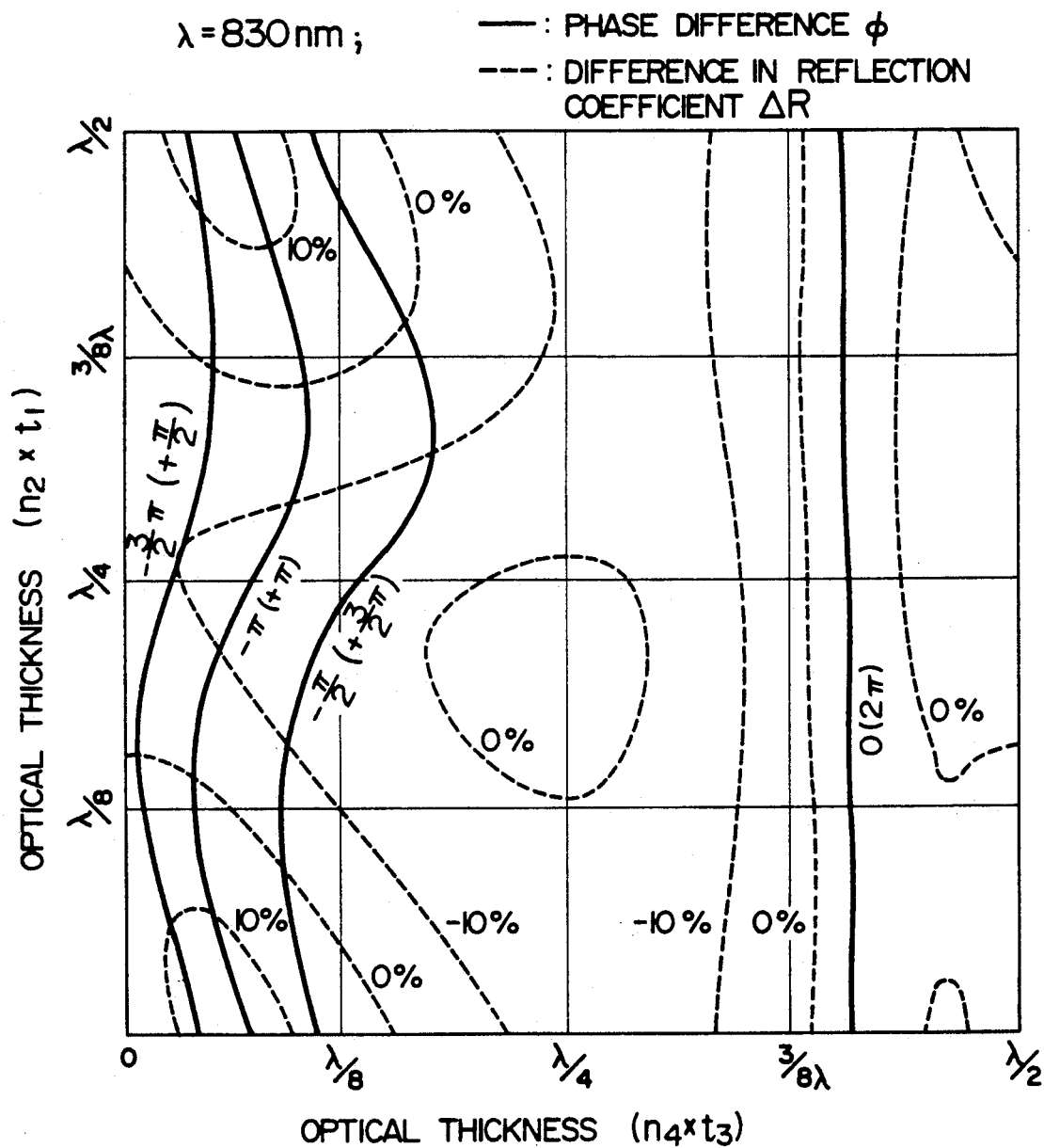
FIGS. 7 is a graph showing the dependence on the thickness of the transparent layers, of the change in the reflection coefficient and of the optical phase change of reflected light in an embodiment of the present invention.

In the structure above, in a case where the thickness $t_2$ of the recording film layer 3 is 10 nm and the thickness $t_4$ of the reflective layer 5 is 20 nm, the i calculated values of the dependence on the thickness $t_1$ and $t_3$ of the transparent layer 2 and 4 of the difference or change R in the reflection coefficient R and of the optical phase difference or change $\phi$ between before and after annealing, that is, between the amorphous state and the crystalline state, are shown in FIG. 7. In FIG. 5, T1 and T3 are expressed after being converted into the optical thickness through calculation of $n_2 \times t_1$ and $n_4 \times t_3$ respectively ($n_2$ and $n_4$ representing the refractive index of the respective transparent layers $t_2$ and $t_4$). From FIG. 7, it is understood that although both of the reflection coefficient difference $\Delta R$ and the optical phase difference $\phi$ are changed in accordance with the thicknesses $t_1$ and $t_3$, particular dependence on the thicknesses $t_1$ and $t_3$ are different from each other, and there can be obtained such film thicknesses $t_1$ and $t_3$ that assure $\Delta R = 0$ and give a large optical phase difference.

For example, when the thickness $t_1$ of the transparent layer 2 is 142 nm (which corresponds to $23/64 \times \lambda$) and the thickness $t_3$ of the transparent layer 4 is 37 nm (which corresponds to $6/64 \times \lambda$), a reflection coefficient difference becomes about 0% and an optical phase difference becomes about $-0.9 \pi$. When the thickness $t_1$ of the transparent layer 2 is 37 nm (which corresponds to $6/64 \times \lambda$) and the thickness $t_3$ of the transparent layer 4 is 37 nm (which corresponds to $6/64 \times \lambda$), a reflection coefficient difference becomes about 0% and an optical phase difference becomes about $-0.46 \pi$.

Figure 8A:
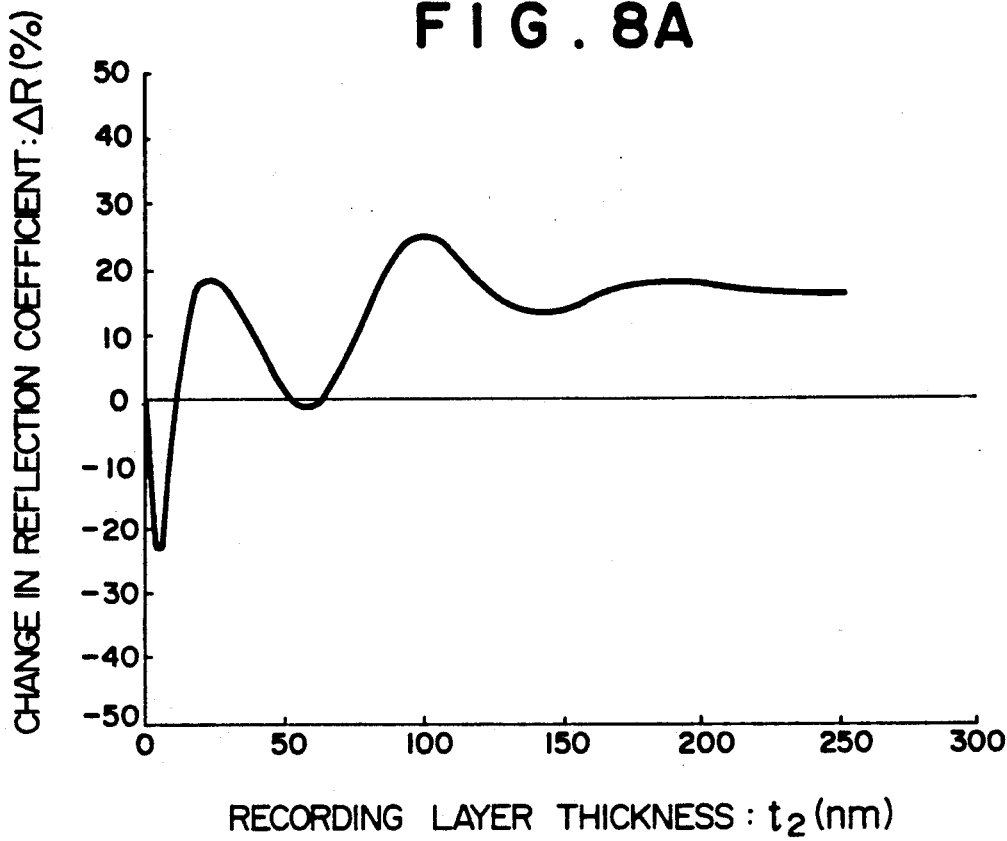
FIGS. 8A and 8B are graphs showing the dependence on the recording film thickness, of the change in the reflection coefficient and of the optical phase change of reflected light in another embodiment of the present invention, respectively.
Figure 8B:
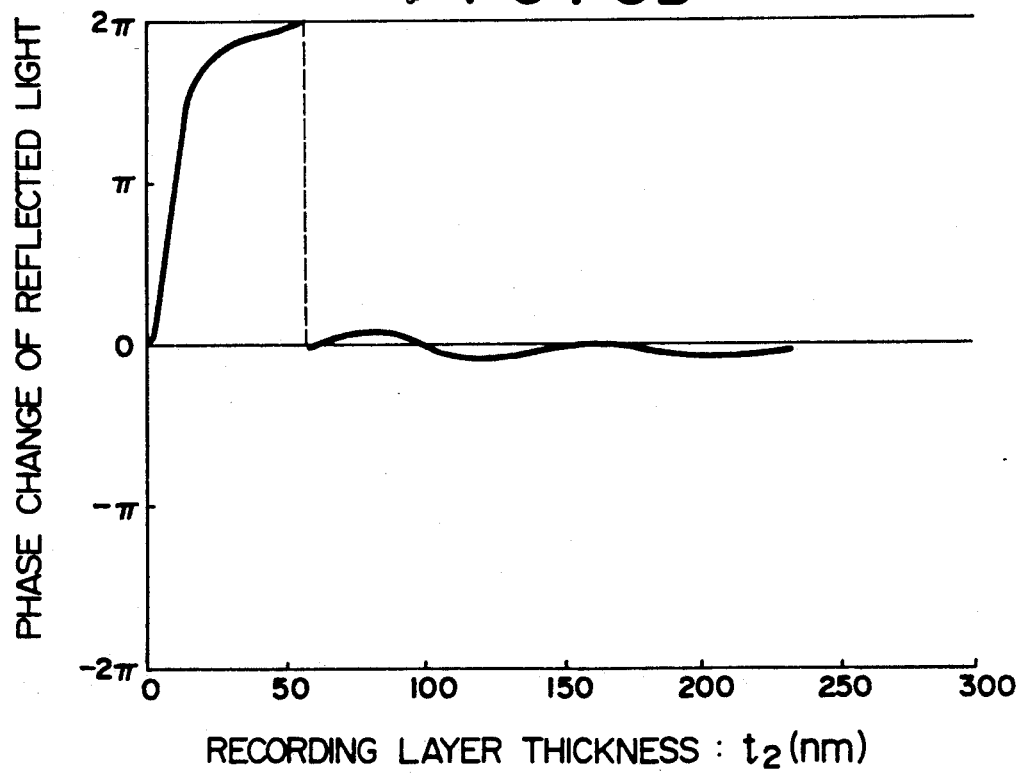

Further, in the case where the thickness $t_1$ of the transparent layer 2 is 142 nm (which corresponds to $23/64 \times \lambda$) and the thickness $t_3$ of the transparent layer 4 is 37 nm (which corresponds to $6/64 \times \lambda$), the calculated dependence; on the thickness $t_3$ of the recording film 3, of the reflection coefficient change $\Delta R$ and of the optical phase change of the reflected light between before and after the structural phase change, that is, between the amorphous state and the crystalline state, are shown in FIGS. 8A and 8B. It is shown that in the condition shown in FIG. 7, that is, when the thickness $t_2$ of the recording film layer 2 is 10 nm, no change takes place in the reflection coefficient and the optical phase change of the reflected light is about $-0.9 \pi$ ($=1.1 \pi$) which almost approximate to $\pi$. It can be also seen that when thickness $t_2$ becomes large sufficiently such as to be 50 nm or more, very little optical phase change of not larger than $\pi/6$ takes place. This is because the optical phase of the reflected light is changed greatly only in the limited area in which the thickness of the recording film is small and the transmittance of the recording film itself is sufficiently large.

As a result, it can be seen that it is possible to obtain a structure the reflection coefficient of which is scarcely changed and in which the optical phase of the reflected light alone is changed by suitably selecting the thickness of each layer. On the basis of the above calculation, the following experiment was carried out.

On a PC resin disc of 1.2 mm thickness and 200 mm diameter used as the substrate, a film of ZnS was deposited by evaporation to a thickness of 142 nm in accordance with the above-described method while rotating the PC disc in vacuum, and a recording layer of $Ge_2Sb_2Te_5$ was further deposited in amorphous state to a thickness of 10 nm in the same way. Further, another ZnS film of 235 nm thickness was deposited by evaporation and then Au was deposited by evaporation to a thickness of 20 nm. Another multilayer film of the same structure was also formed on a glass substrate of 18×18 mm area and 0.2 mm thickness. In addition, the multilayer film formed on the resin disc was covered with another PC resin disc of the same kind with UV curing adhesives so as to form a contact protective layer, thus forming an optical recording medium.

The sample formed on the glass substrate was heated at 300° C. for five minutes in an atmosphere of argon so as to wholly crystallize $Ge_2Sb_2Te_5$ of the recording layer. The coefficients of reflection from the substrate side measured before and after crystallization were both about 11%, which means that no change was observed.

A semiconductor laser beam having the wavelength of 830 nm was focused by a lens system of the numerical aperture of 0.5 on the recording film at a linear velocity of 10 m/sec while rotating this medium. A light beam modulated at a single modulation frequency of 5 MHz at a percentage modulation of 50% was irradiated onto the surface of the recording film to have a power of 8 mW thereon so as to partially crystallize the recording film for effecting recording, and then the reflected light of the light beam irradiated continuously with an output power of 1 mW was detected by a photodetector for effecting reproduction. As a result, amplitude of "reproducing signal" was observed.

In the sample on the glass substrate mentioned above, crystallization caused no change in the reflection coefficient. It is therefore understood that the "reproducing signal" was produced due to difference in the optical phases of the reflected lights between from the recorded portion and from the non-recorded portion.

Furthermore, it was confirmed that when recording and reproduction were effected by changing the frequency of the signal to be recorded, the frequency characteristic was improved at a frequency zone higher than that available in the conventional structure having the recording film of 85 nm thickness as shown in FIG. 4.

In addition, the laser beam was continuously applied or irradiated likewise onto the surface of the recording film in which signals had been recorded at the linear velocity of 10 m/sec to have thereon a power of 16 mW larger than that at the time of recording. Then it was confirmed that the recording film was melted to be changed into amorphous state to thereby erase the signals recorded before.

EXAMPLE 2

Figure 12:
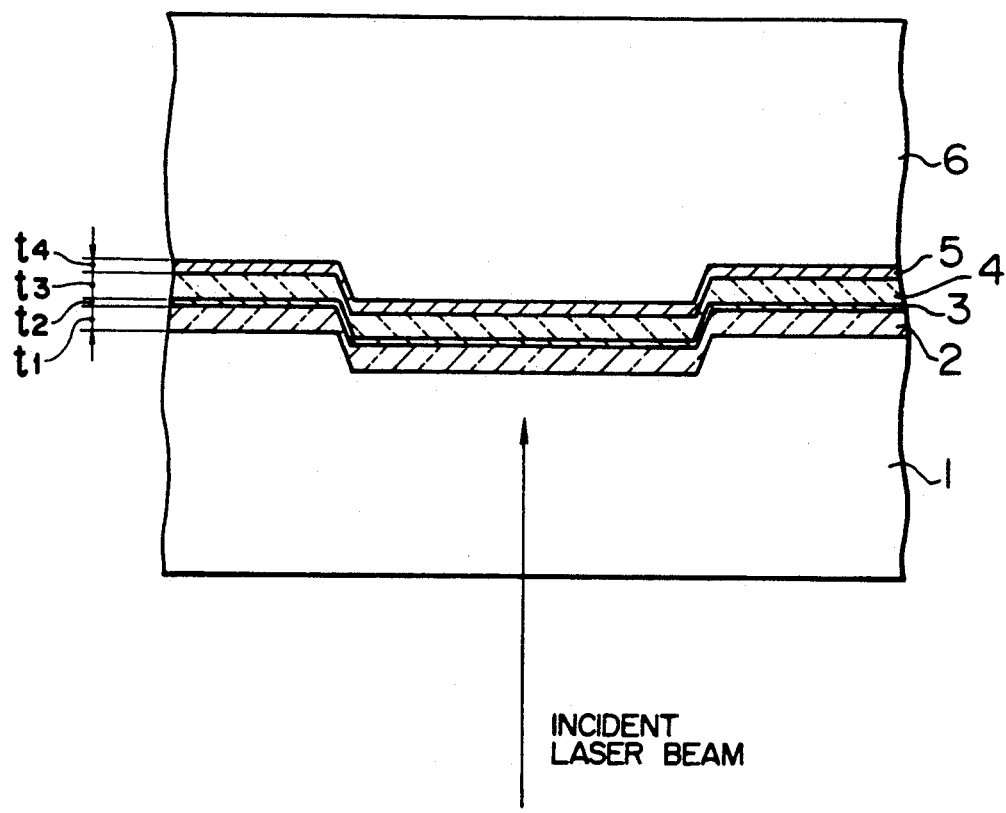
FIG. 12 and FIGS., 13, 14 and 15 are respectively schematic sectional view and oblique views showing the form of the embodiments according to the present invention.

As shown in FIG. 12, a PC resin disc of 1.2 mm thickness and 200 mm diameter provided with a tracking groove of 0.6 μm width and 65 nm depth in advance was used as the substrate 1. ZnS film 2 was deposited by evaporation on this resin disc 1 to a thickness of 37 nm while rotating it and a recording film 3 of $Ge_2Sb_2Te_5$ in amorphous state was further formed thereon likewise to a thickness of 10 nm. In addition, another ZnS film 4 was deposited by evaporation to a thickness of 37 nm and Au layer 5 was deposited to a thickness of 20 nm. Another multilayer film of the same structure was also formed on a glass substrate of 18×18 mm area and 0.2 mm thickness. In addition, the multilayer film formed on the resin disc was covered with another PC resin disc of the same kind with UV curing adhesives so as to form a contact protective layer 6, thus forming an optical recording medium.

The sample formed on the glass substrate was heated at 300° C. for five minutes in an atmosphere of argon so as to be wholly crystallized. The coefficients of reflection from the substrate side measured before and after crystallization were both about 8%, which means that there was caused no change.

The medium formed on the resin disc was rotated and a semiconductor laser beam having the wavelength of 830 nm was focused by a lens system of the numerical aperture of 0.5 onto the recording film while effecting the tracking control along the tracking groove. A light beam modulated at a single modulation frequency of 5 MHz at a percentage modulation of 50% was irradiated onto the surface of the recording film to have a power of 7.5 mW thereon so as to partially crystallize the recording film, thus effecting recording. Tracking control was stable even after recording. Further, the reflected light of the light beam applied or irradiated continuously with an output power of 1 mW was detected by a photodetector for effecting reproduction, as a result of which amplitude of "reproducing signal" was observed.

In the sample on the glass substrate mentioned above, crystallization caused no change in the reflection coefficient. It is therefore understood that the reproducing signal was produced due to difference in the optical phase of the reflected light between from the recorded portion and from the non-recorded portion. It is also confirmed that the optical phase difference was in the range which had no adverse effect on the tracking control.

Furthermore, it was confirmed that when recording and reproduction were effected by changing the frequency of the signal to be recorded, the frequency characteristic was improved such that the available frequency extended to a higher-frequency zone as compared with the conventional structure having the recording film of 85 nm thickness as shown in FIG. 4.

In addition, it was confirmed that when the laser beam was continuously applied or irradiated likewise onto the surface of the recording film in which signals had been recorded at the linear velocity of 10 m/sec to have thereon a power of 16 mW larger than that at the time of recording, the recording film was melted to be changed into amorphous state to thereby erase the signals recorded before.

EXAMPLE 3

A ternary compound having the composition of $Te_{49}O_{28}Pd_{23}$ which is a structural phase change material is used as the recording film. An electron beam evaporation method making use of three evaporation sources of Te, $TeO_2$ and Pd is adopted as an evaporation method.

On measuring the optical constants of the film in amorphous state formed by depositing the material of the composition $Te_{49}O_{28}Pd_{23}$ alone onto the glass plate by evaporation, the complex refractive index $n+ki$ was $3.1+1.2i$ at the wavelength of 830 nm. After subjection of this film to annealing at 300° C. for five minutes so as to change into crystalline state, that value is changed to $3.9+1.6i$.

In the conventional structure shown in FIG. 4, the difference $\Delta R$ in the reflection coefficient between the amorphous state and the crystalline state becomes local maxima at the film thicknesses of 35 nm and 135 nm and takes the value of not smaller than 10%, while there is caused very little optical phase change of not larger than $\pi/8$.

Figure 2:
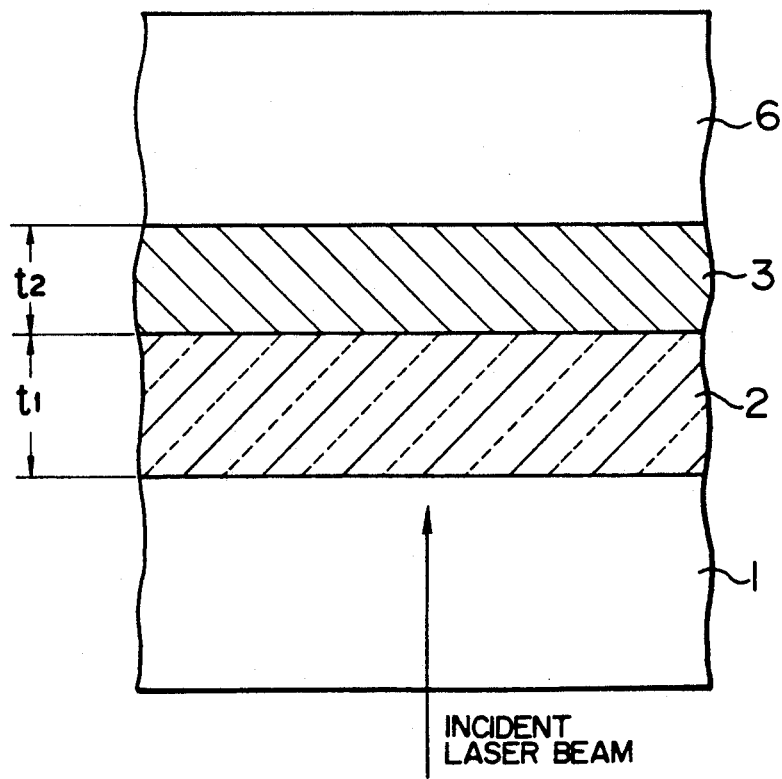
FIGS. 2 and 3 are schematic sectional views showing other embodiments of the present invention.
Figure 9A:
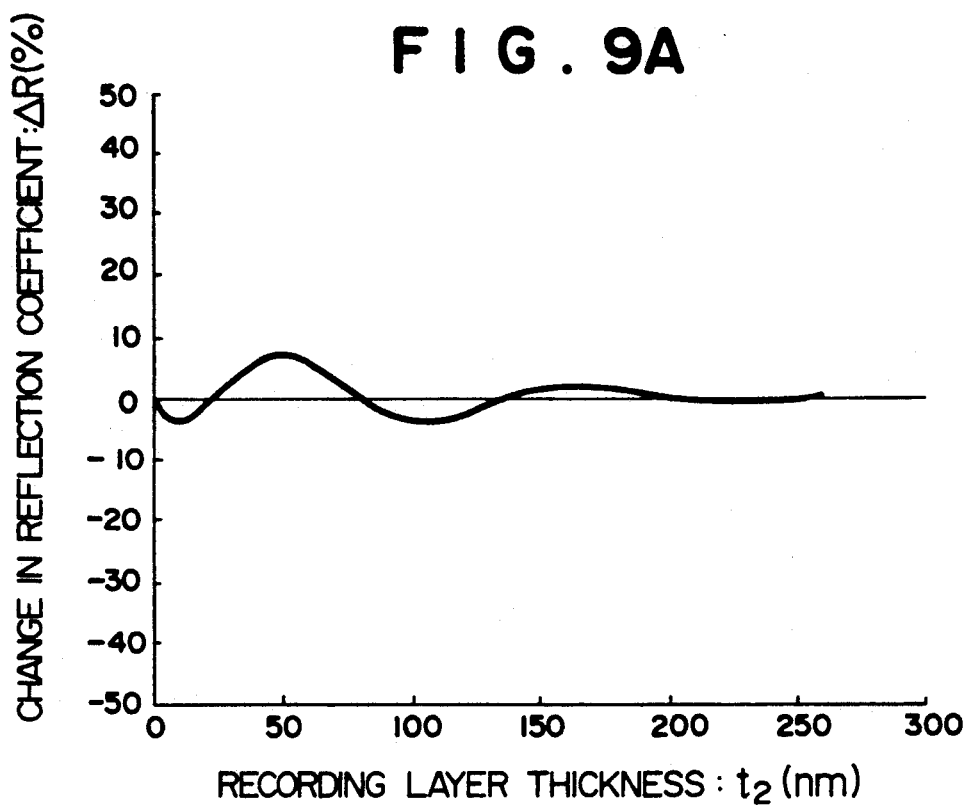
FIGS. 9A, 9B, 10A, 10B, 11A and 11B are graphs showing the dependence on the recording film thickness, of the change in the reflection coefficient and of the optical phase change of reflected light in still other embodiments of the present invention.
Figure 9B:
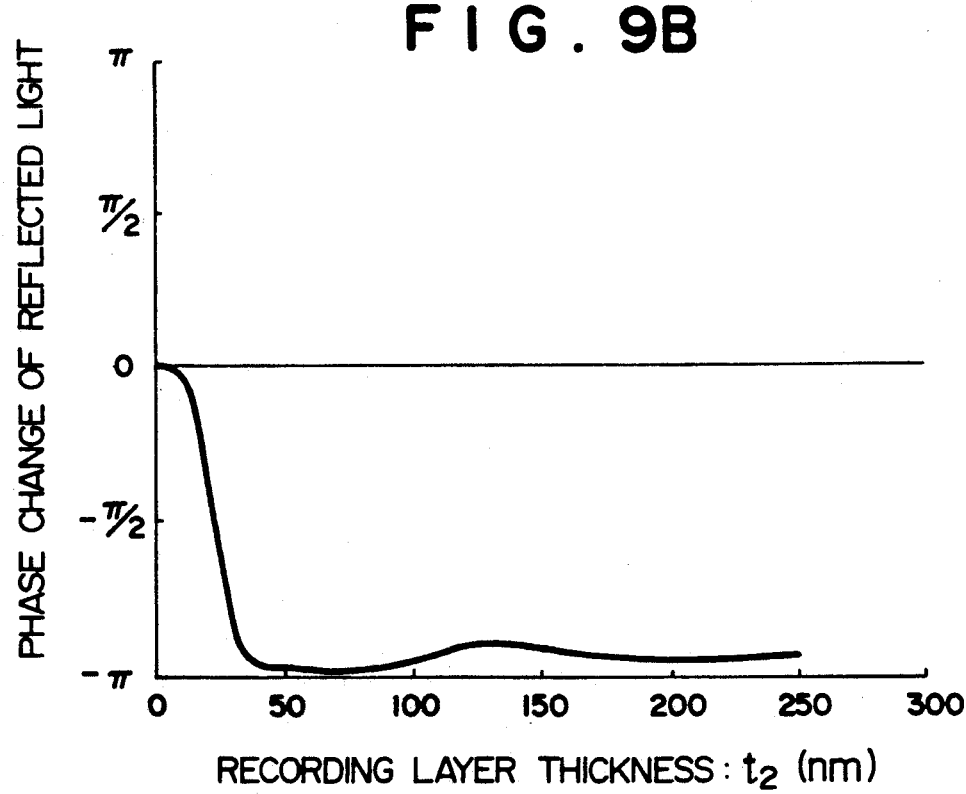

As shown in FIG. 2, ZnS (having a refractive index of 2.40) was deposited by electron beam evaporation method onto a polycarbonate resin plate 1 (PC having the refractive index of 1.58) to a thickness of 97 nm so as to serve as the transparent optical layer 2, onto which the recording film 3 of $Te_{49}O_{28}Pd_{23}$ was formed in the same manner as described above and, further, a coating 6 of resin of the material having the same refractive index as the substrate was applied thereon. With the structure above as shown in FIG. 2, the calculated dependence on the film thickness $t_2$, of the change $\Delta R$ in the reflection coefficient R and of the optical phase change of the reflected light between before and after annealing, that is, between in amorphous state and in crystalline state, are shown in FIGS. 9A and 9B.

It is shown that when the thickness of the recording film 3 is 20 nm, there is caused very little change in the reflection coefficient and an optical phase change of the reflected light of about $-\pi/2$ can be obtained. On the basis of these results of calculation, the following experiment was carried out.

PC resin disc of 1.2 mm thickness and 200 mm diameter used as the substrate was deposited thereon by evaporation with a film of ZnS to a thickness of 97 nm in accordance with the above-described method while being rotated in a vacuum, onto which a recording film of $Te_{49}O_{28}Pd_{23}$ was deposited by evaporation to a thickness of 20 nm likewise. Further, another PC resin disc of the same kind was bonded with UV curing adhesives so as to form a contact protective layer. A semiconductor laser beam having the wavelength of 830 nm was focused by a lens system of the numerical aperture of 0.5 onto the recording film at a linear velocity of 5 m/sec while rotating this disc. A light beam modulated at a single modulation frequency at a percentage modulation of 50% was applied onto the surface of the recording film to have thereon a power of 8 mW for effecting recording, and the reflected light of the light beam applied continuously with an output power of 1 mW was detected by a photodetector for effecting reproduction. As a result, the existence of reproducing signal was confirmed. It was also confirmed that the frequency characteristic was improved such that the available frequency extended to a higher-frequency zone as compared with the conventional structure having the recording film of 135 nm thickness as shown in FIG. 4.

EXAMPLE 4

Figure 3:
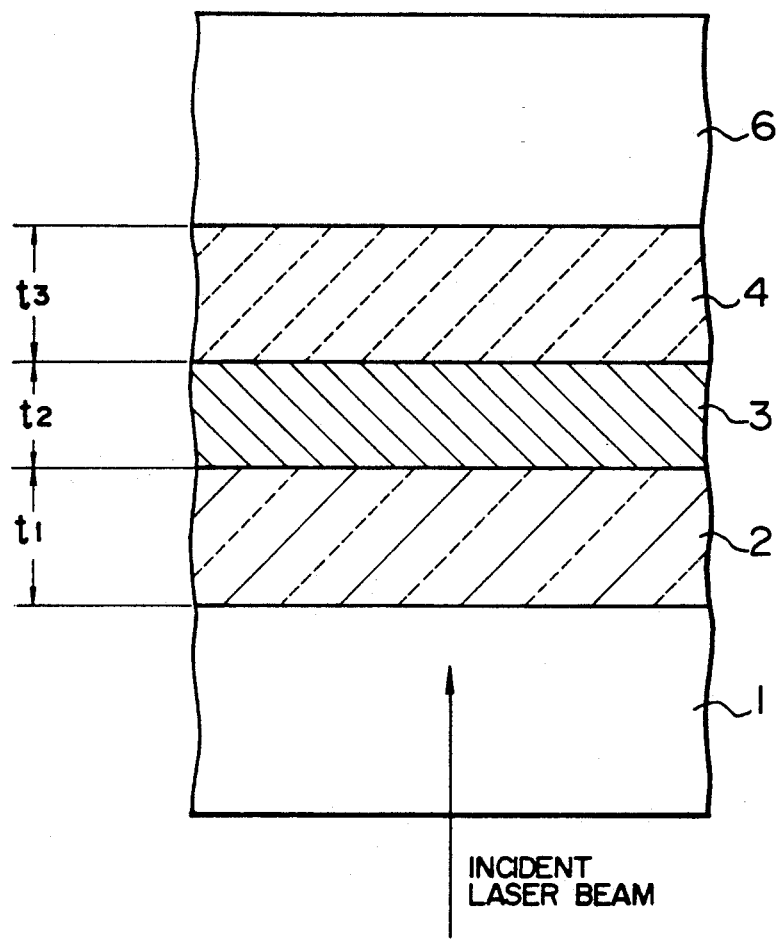
Figure 10A:
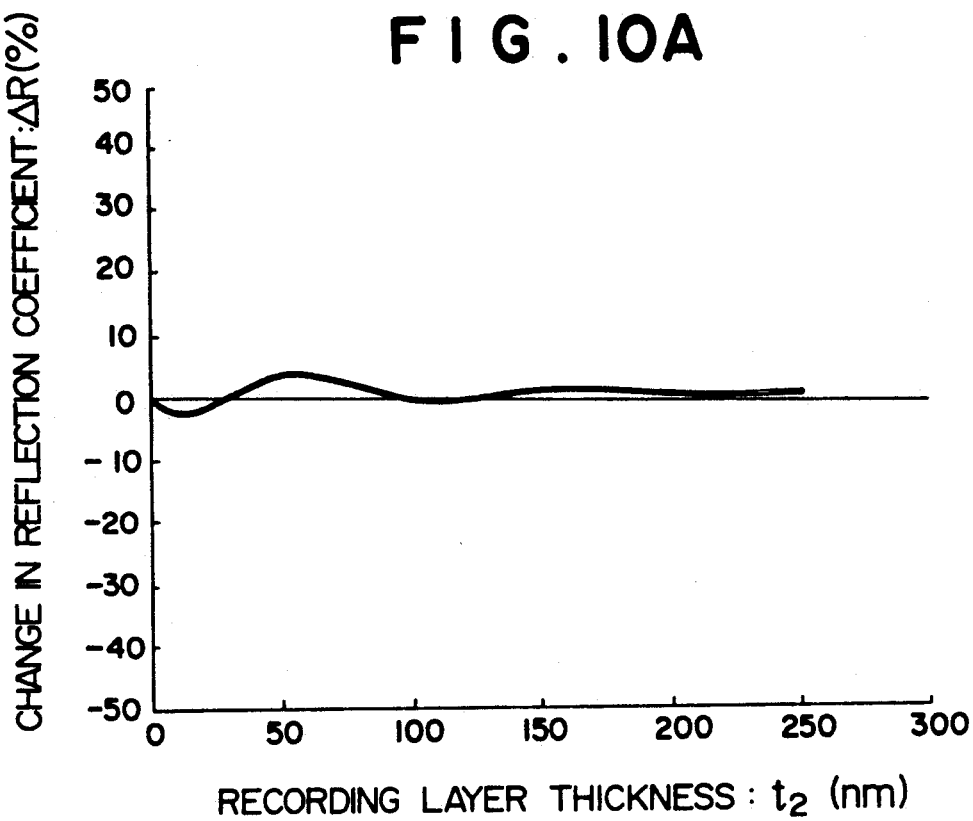
Figure 10B:
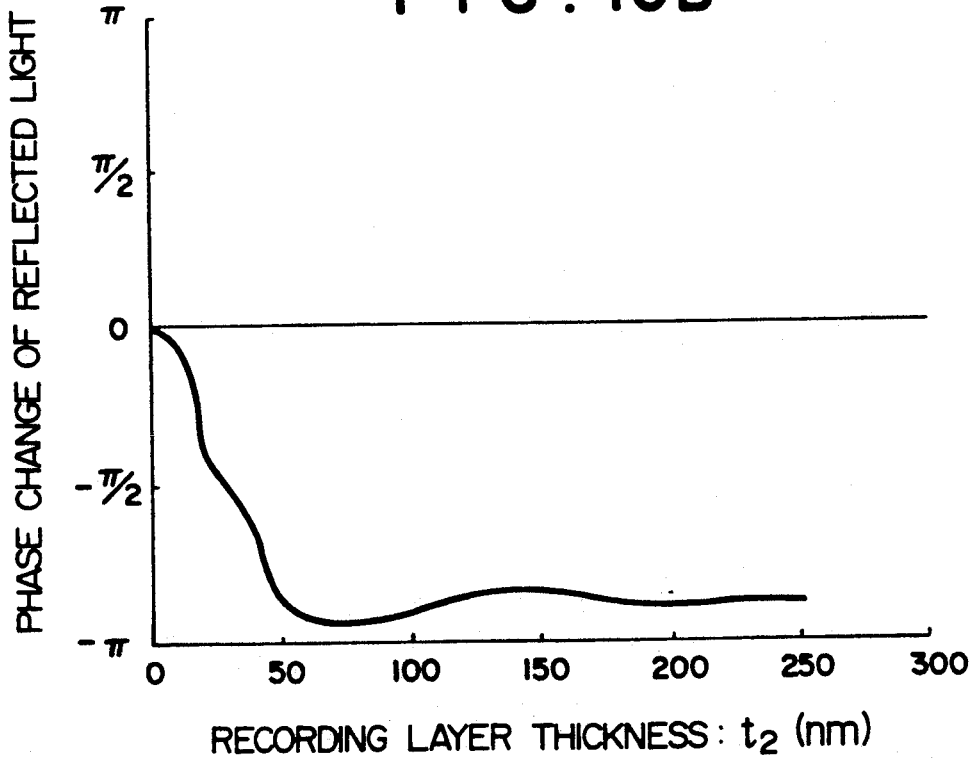

As shown in FIG. 3, ZnS (having a refractive index of 2.40) was deposited by electron beam evaporation method onto a polycarbonate resin plate 1 (PC having a refractive index of 1.58) to a thickness of 76 nm so as to serve as a transparent optical layer 2, onto which the recording film 3 of $Te_{49}O_{28}Pd_{23}$ shown in the embodiment 3 was formed in the same manner as shown in the embodiment 3 and, further, a layer 4 of ZnS was deposited by evaporation to a thickness of 130 nm likewise, and finally, a coating 6 of resin of the material having the same refractive index as the substrate 1 was applied thereon. In the structure above, the calculated dependence on the film thickness $t_2$ of the change $\Delta R$ in the reflection coefficient R and of the optical phase change of the reflected light between before and after annealing, that is, between in amorphous state and in crystalline state, are shown in FIGS. 10A and 10B.

It is shown that when the thickness of the recording film is 30 nm, there is caused very little change $\Delta R$ in the reflection coefficient and an optical phase change of the reflected light of about $-\pi/2$ can be obtained.

EXAMPLE 5

Figure 11A:
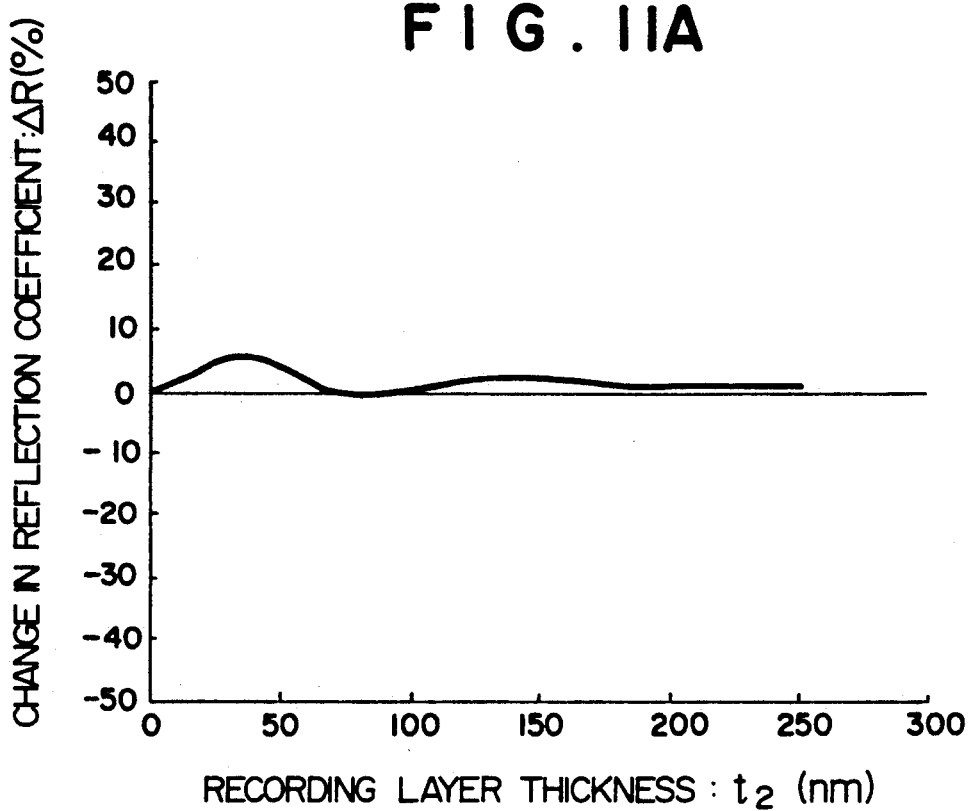
Figure 11B:
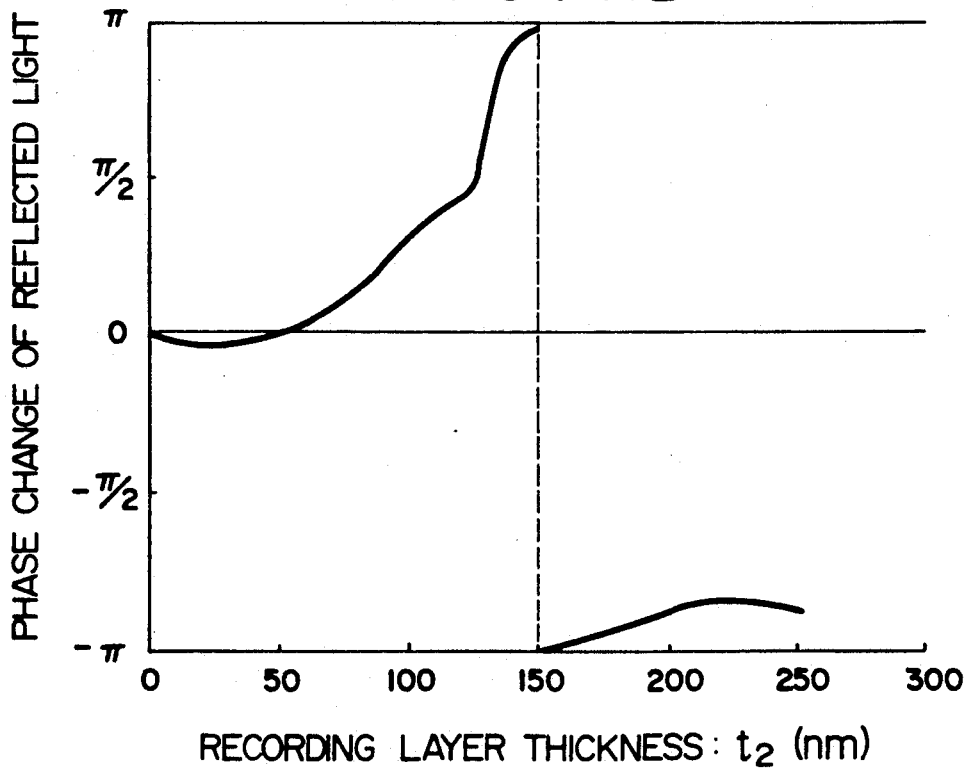

As shown in FIG. 3, ZnS (having a refractive index of 2.40) was deposited by electron beam evaporation method onto a polycarbonate resin plate 1 (PC having a refractive index of 1.58) to a thickness of 120 nm so as to serve as the transparent optical layer 2, onto which the recording film 3 of $Te_{49}O_{28}Pd_{23}$ shown in the embodiment 3 was formed in the same manner as shown in the embodiment 3 and, further, a layer 4 of ZnS was deposited by evaporation to a thickness of 54 nm likewise, and finally, a coating 6 of resin of the material having the same refractive index as the substrate 1 was applied thereon. In the structure above, the calculated the dependence on the film thickness $t_2$, of the change $\Delta R$ in the reflection coefficient R and of the optical phase change of the reflected light between before and after annealing, that is, between in amorphous state and in crystalline state, are shown in FIGS. 11A and 11B.

It is shown that when the thickness $t_2$ of the recording film is 120 nm, there is caused very little change in the reflection coefficient and an optical phase change of the reflected light of about $\pi/2$ can be obtained.

What is claimed is:

1. An optical information recording medium of multilayer structure comprising a substrate and a recording layer formed thereon, said recording layer being capable of undergoing an optically detectable change upon application of an incident information recording light beam thereto to record an information signal therein in accordance with said change, wherein a material of said recording layer comprises a property such that a complex refractive index thereof is changed to record said information signal upon application of said incident information recording light beam thereto such that said change produces, due to interference of reflected light and transmitted light in said multi-layer structure, a difference in an optical phase of at least one of said reflected light and said transmitted light from the multilayer structure at an information signal-recorded region of said recording layer where the information signal has been recorded relative to an optical phase of said at least one of said reflected light and said transmitted light from the multi-layer structure at a non-information signal-recorded region of said recording layer where the information signal has not been recorded, without alteration of a geometric shape of said recording layer and with substantially negligible difference in an amplitude of said at least one of said reflected light and said transmitted light from the multi-layer structure at said information signal-recorded region relative to an amplitude of said at least one of said reflected light and said transmitted light at said non-information signal-recorded region.

2. An optical information recording medium as in claim 1, wherein said optically detectable change produces an optical phase difference of reproduction light which is incident on a detector and which is weak enough not to cause a change in the recording medium being detected by the detector.

3. An optical information recording medium according to claim 1, wherein said recording medium further comprises a transparent layer formed on at least one surface of the recording layer, said transparent layer comprising a different refractive index from that of said substrate.

4. An optical information recording medium according to claim 1, wherein the recording medium further comprises a first transparent layer formed between the substrate and the recording layer, said first transparent layer having a different refractive index from that of the substrate, a second transparent layer formed on an opposite side of said recording layer from said first transparent layer and reflective layer formed on said second transparent layer, dimensions of said first transparent layer, said second transparent layer, said recording layer, and said reflective layer being selected such that the optical phase of said at least one of the transmitted light and the reflected light shifts in response to a change in the complex refractive index of the material comprising the recording medium.

5. An optical information recording medium according to claim 1, wherein the difference in said optical phase is substantially $(1\pm2n)\pi$, n being an integer.

6. An optical information recording medium according to claim 1, wherein the shape of the recording layer is not changed at the time of making change with application of the light beam.

7. An optical information recording medium according to claim 1, wherein the optically detectable change in the recording layer due to application of the incident information recording light beam is reversible and the information signal recorded on said recording layer is erasable.

8. An optical information recording medium of multi-layer structure comprising a recording layer formed on a substrate, said recording layer comprising a material capable of undergoing an optically detectable change upon application of an incident information recording light beam thereto to record an information signal therein in accordance with said change, said substrate comprising at least one of concave and convex media means, said media shifting an optical phase of at least one of reflected light and transmitted light from a surface thereof on which said incident information recording light beam if applied and on which the recording layer is formed, the material comprising said recording layer further comprising a complex refractive index, said index being changed to record said information signal upon application of the incident information recording light beam thereto, said change producing, due to interference of reflected light and transmitted light in said multi-layer structure, a difference in an optical phase of said at least one of the reflected light and the transmitted light from said multi-layer structure at an information signal-recorded region of said recording layer where the information signal has been recorded relative to an optical phase of said at least one of said reflected light and said transmitted light from the multi-layer structure at a non-information signal-recorded region of said recording layer where the information signal has not been recorded, without alteration of a geometric shape of said recording layer and with substantially negligible difference in an amplitude of said at least one of said reflected light and said transmitted light from the multi-layer structure at said information signal-recorded region relative to an amplitude of said at least one of said reflected light and said transmitted light at said non-information signal-recorded region.

9. An optical information recording medium as in claim 8, wherein said optically detectable change produces an optical phase difference of reproduction light which is incident on a detector and which is weak enough not to cause a change in the recording medium being detected by the detector.

10. An optical information recording medium according to claim 8, wherein a first transparent layer having a different refractive index from that of the substrate, said recording layer, a second transparent layer and a reflective layer are formed on said substrate in that order, thicknesses of said first transparent layer, said recording layer, second transparent layer and said reflective layer being selected such as to cause said difference in said optical phase of said at least one of the reflected light and the transmitted light in response to the change in the complex reflective index of the material of the recording layer.

11. An optical information recording medium according to claim 8, wherein the difference in said optical phase is substantially $(1\pm2n)\pi$, n being an integer.

12. An optical information recording medium according to claim 8, wherein the difference in said optical phase is substantially $(-\frac{1}{2}\pm2n)\pi$, n being an integer.

13. An optical information recording medium according to claim 8, wherein the difference in said optical phase is substantially $(+\frac{1}{2}\pm2n)\pi$, n being an integer.

14. An optical information recording medium of multi-layer structure comprising a recording layer formed on a substrate, said recording layer comprising a material capable of undergoing an optically detectable change upon application of an incident information recording light beam thereto to record an information signal therein in accordance with said change, said substrate comprising at least one of concave and convex media means, said media shifting an optical phase of at least one of reflected light and transmitted light from a surface of said recording layer on which said incident information recording light beam is applied, said recording layer further comprising a complex refractive index, said index being changed to record said information signal upon application of the incident information recording light beam thereto, said change producing, due to interference of reflected light and transmitted light in said multi-layer structure, a difference in an optical phase of said at least one of said reflected light and said transmitted light from said multi-layer structure at an information signal-recorded region of said recording layer where the information signal has been recorded relative to an optical phase of said at least one of said reflected light and said transmitted light from the multi-layer structure at a non-information signal-recorded region of said recording layer where the information signal has not been recorded, without alteration of a geometric shape of said recording layer and with substantially negligible difference in an amplitude of said at least one of said reflected light and said transmitted light from the multi-layer structure at said information signal-recorded region relative to an amplitude of said at least one of said reflected light and said transmitted light at said non-information signal-recorded region.

15. An optical information recording medium according to claim 14, wherein the difference in said optical phase is substantially $(1 \pm 2n)\pi$, n being an integer.

16. An optical information recording medium as in claim 14, wherein said optically detectable change produces an optical phase difference of reproduction light which is incident on a detector and which is weak enough not to cause a change in the recording medium being detected by the detector.

17. An information recording method for an optical information recording medium of multi-layer structure comprising a recording layer formed on a substrate, said recording layer comprising a material capable of undergoing an optically detectable change upon application of an incident information recording light beam thereto to record an information signal therein in accordance with said change, said substrate comprising at least one of concave and convex media means, said media means shifting an optical phase of at least one of reflected light and transmitted light from a surface of said recording layer on which said incident information recording light beam is applied, said recording layer further comprising a complex refractive index, said index being changed to record said information signal upon application of the incident information recording light beam thereto, said change producing, due to interference of reflected light and transmitted light in said multi-layer structure, a difference in an optical phase of said at least one of the reflected light and the transmitted light from said multi-layer structure at an information signal-recorded region of said recording layer where the information signal has been recorded relative to an optical phase of said at least one of said reflected light and said transmitted light from the multi-layer structure at a non-information signal-recorded region of said recording layer where the information signal has not been recorded, without alteration of a geometric shape of said recording layer and with substantially negligible difference in an amplitude of said at least one of said reflected light and said transmitted light from the multi-layer structure at said information signal-recorded region relative to an amplitude of said at least one of said reflected light and said transmitted light at said non-information signal-recorded region, said method comprising: recording and reproducing said information signal on and from said recording layer by using said at least one of the concave and convex media means for shifting the optical phase of the reflected light or the incident light while executing tracking.

18. An optical information recording method as in claim 17, wherein said optically detectable change produces an optical phase difference of reproduction light which is incident on a detector and which is weak enough not to cause a change in the recording medium being detected by the detector.

19. An information recording method for an optical information recording medium of multi-layer structure comprising a recording layer formed on a substrate, said recording layer comprising a material capable of undergoing an optically detectable change upon application of an incident information recording light beam thereto to record an information signal therein in accordance with said change, said substrate comprising at least one of concave and convex media means, said media means shifting an optical phase of at least one of reflected light or transmitted light from a surface of said recording layer on which said incident information recording light beam is applied, said recording layer comprising a complex refractive index, said index being changed to record said information signal upon application of the incident information recording light beam thereto, said change producing, due to interference of reflected light and transmitted light in said multi-layer structure, a difference in an optical phase of said at least one of said reflected light and said transmitted light from said multi-layer structure at an information signal-recorded region of said recording layer where the information signal has been recorded relative to an optical phase of said at least one of said reflected light and said transmitted light from the multi-layer structure at a non-information signal-recorded region of said recording layer where the information signal has not been recorded, without alteration of a geometric shape of said recording layer and with substantially negligible difference in an amplitude of said at least one of said reflected light and said transmitted light from the multi-layer structure at said information signal-recorded region relative to an amplitude of said at least one of said reflected light and said transmitted light at said non-information signal-recorded region, said method comprising: applying a reproducing light beam onto the at least one of the concave and convex media means by modulation in accordance with an information signal.

20. An optical information recording method as in claim 19, wherein said optically detectable change produces an optical phase difference of reproduction light which is incident on a detector and which is weak enough not to cause a change in the recording medium being detected by the detector.

21. An information recording and reproducing method for an optical information recording medium of multi-layer structure comprising a recording layer formed on a substrate, said recording layer comprising a material capable of undergoing an optically detectable change upon application of an incident information recording light beam thereto to record an information signal therein in accordance with said change, said substrate comprising at least one of concave and convex media means, said media means shifting an optical phase of at least one of reflected light or transmitted light from a surface of said recording layer on which said incident information recording light beam is applied, the recording layer further comprising a complex refractive index, said index being changed to record said information signal upon application of the incident information recording light beam thereto, said change producing, due to interference of reflected light and transmitted light in said multi-layer structure, a difference in an optical phase of said at least one of the reflected light and the transmitted light from said multi-layer structure at an information signal-recorded region of said recording layer where the information signal has been recorded relative to an optical phase of said at least one of said reflected light and said transmitted light from the multi-layer structure at a non-information signal-recorded region of said recording layer where the information signal has not been recorded, without alteration of a geometric shape of said recording layer and with substantially negligible difference in an amplitude of said at least one of said reflected light and said transmitted light light from the multi-layer structure at said information signal-recorded region relative to an amplitude of said at least one of said reflected light and said transmitted light at said non-information signal-recorded region, said method comprising: applying a reproducing light beam onto the at least one of concave and convex media means by modulation in accordance with an information signal.

22. An optical information recording method as in claim 21, wherein said optically detectable change produces an optical phase difference of reproduction light which is incident on a detector and which is weak enough not to cause a change in the recording medium being detected by the detector.

* * * * *